(12) United States Patent
Herndon

(10) Patent No.: US 6,925,791 B2
(45) Date of Patent: Aug. 9, 2005

(54) HAND-OPERATED GATHERER

(76) Inventor: George W. Herndon, 806 N. Dawson St., Thomasville, GA (US) 31792

( * ) Notice: Subject to any disclaimer, the term of this patent is extended or adjusted under 35 U.S.C. 154(b) by 0 days.

(21) Appl. No.: 10/684,277

(22) Filed: Oct. 11, 2003

(65) Prior Publication Data
US 2004/0074219 A1 Apr. 22, 2004

Related U.S. Application Data
(60) Provisional application No. 60/418,039, filed on Oct. 11, 2002.

(51) Int. Cl.[7] .......................... A01D 46/24; A01K 29/00
(52) U.S. Cl. .......................................... 56/333; 294/1.4
(58) Field of Search ................................ 56/333, 328.1, 56/332; 172/371–378; 294/1.3, 1.4, 19.1, 19.2, 50.8, 110.1

(56) References Cited
U.S. PATENT DOCUMENTS 2,736,157 A 2/1956 Weathersby
4,848,071 A 7/1989 Laughlin
4,962,957 A 10/1990 Traber
5,380,054 A * 1/1995 Galvis .......................... 294/1.4

OTHER PUBLICATIONS

The Ray Griffith Co., Early Buying Promotional, promotional flyer, 1 page, Columbia, MS, no date.

* cited by examiner

Primary Examiner—Robert E Pezzuto
(74) Attorney, Agent, or Firm—Brian D. Bellamy

(57) ABSTRACT

A hand-operated gatherer for gathering pecans, nuts, or other objects such as golf balls. The gatherer includes a basket assembly connect to a first end of a shaft and a handle and trigger connected to a second end of the shaft. A pair of pivotally hinged doors biased to a closed position by a spring device attach to a frame member in the basket assembly via depending tabs, and a gatherer head comprised of wire bails separate the doors. A control linkage attaches to at least one of the doors and runs lengthwise along the shaft to the trigger, whereby the trigger is finger actuated to pull the control linkage and open the door or doors that are attached to the control linkage to release the items held within the storage component of the basket assembly.

4 Claims, 3 Drawing Sheets

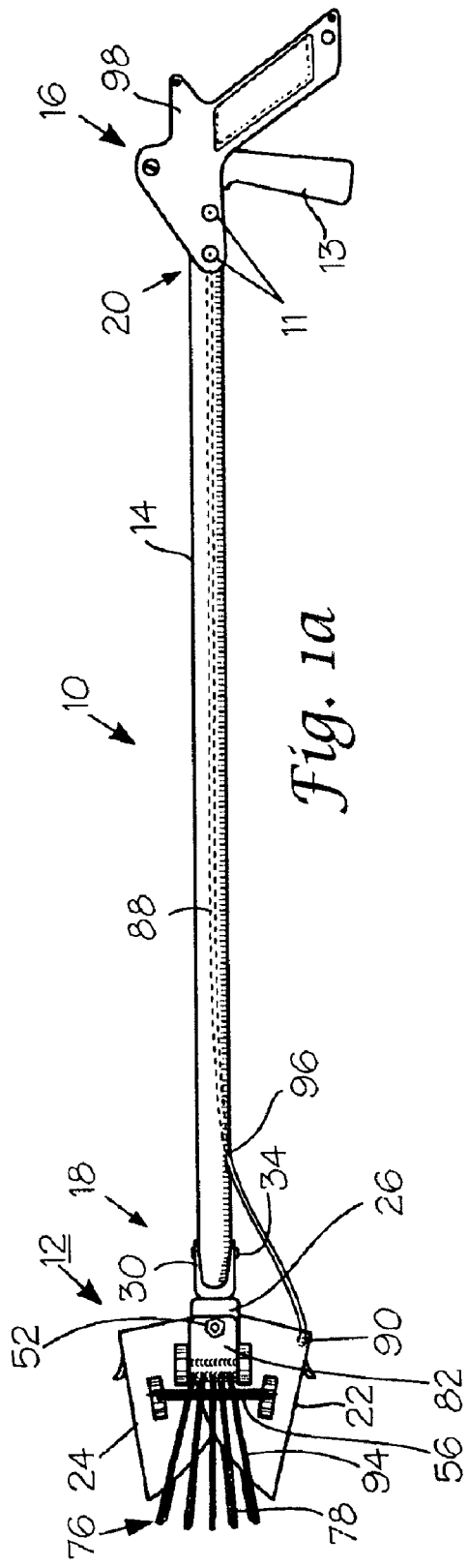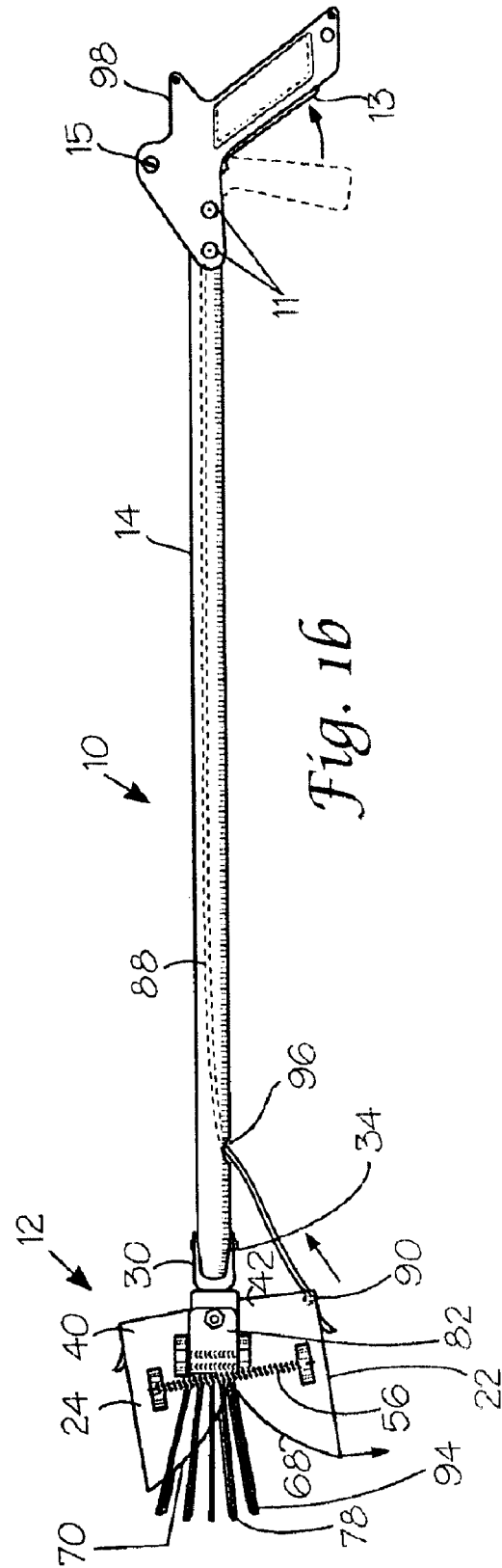

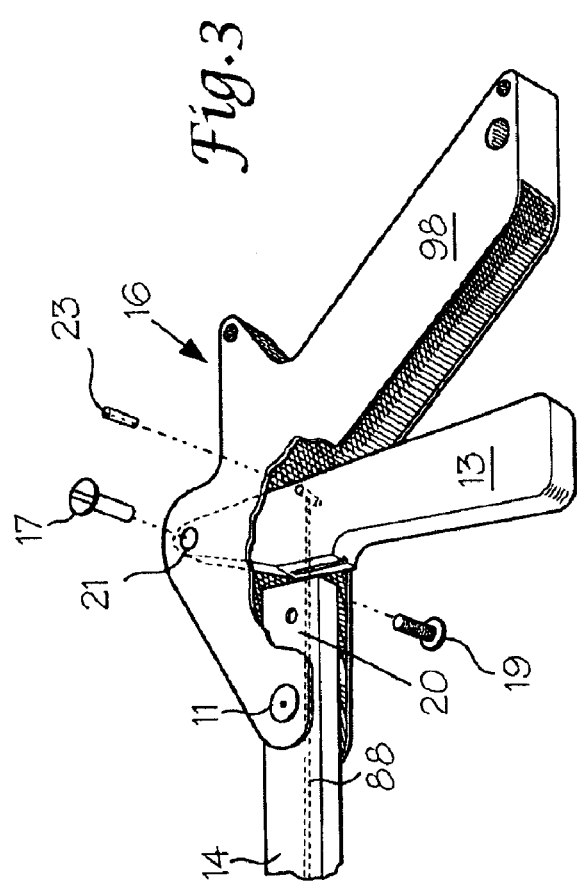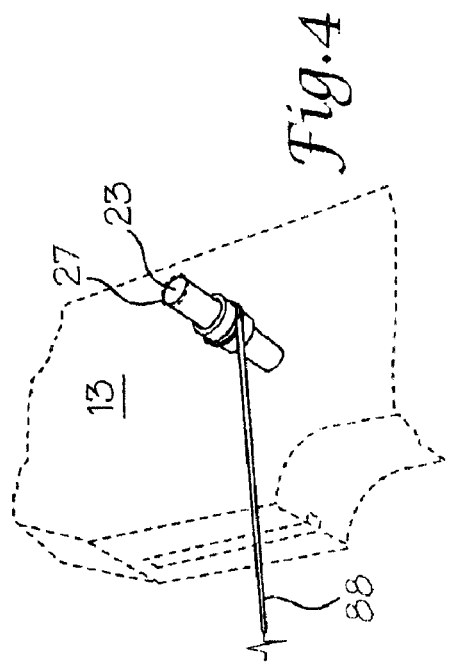

HAND-OPERATED GATHERER

PRIORITY CLAIM

I claim priority of the filing date of U.S. provisional application No. 60/418,039 filed on Oct. 11, 2002.

BACKGROUND OF THE INVENTION

1. Field of the Invention

A hand operated gatherer is provided which enables individuals involved in harvesting small quantities of pecans or nuts to harvest more effectively and efficiently, and may likewise be used to retrieve many small objects from the ground such as rocks, golf balls and firearm casings. The invention is particularly concerned with providing an improved pecan harvester in the field of harvesters having a handle and a harvesting/storage component so that the gatherer may walk uprightly to collect pecans or other objects within the hopper of the harvesting/storage component.

2. Description of the Prior Art

Pecans and nuts are a valued resource for individuals cultivating only a few trees and those who gather the nuts from native forests. In such circumstances, the gatherer has long been forced to stoop and bend to gather nuts from unprepared ground. The ground may be muddy or the nuts may be scattered among leaves, twigs or branches which have fallen to the ground. This is especially burdensome during extended gathering and for the elderly gatherer. Similar burdens are imposed on the gatherers of other small objects that may be scattered on the ground. For example, a golfer practicing shots in a backyard may have to stoop dozens of times during a single session, or a marksman cleaning up after target practice may have to remain stooped for an burdensome amount of time to clean up the spent casings from the ground.

U.S. Pat. No. 4,848,071 to James E. Laughlin provided a hand pecan harvester including a hopper with laterally biased wire bails on the bottom end and an open top end. The open top end of the hopper provided means for emptying the pecans collected by inverting the pecan harvester. A handle enabled the person gathering the pecans to walk upright while gathering. Subsequent improvements in the production of harvester units include the adoption of hinged doors that are designed to be opened by placing one door against the inside wall of a rigid container such as a metal bucket, which can require excess application of force or cause tipping of the container. The Laughlin device and other related devices did eliminate the need for stooping and provided a hopper for pecans until the tool could be emptied. However, the earlier Laughlin device and related devices failed to provide a convenient means for emptying the tool.

The inventor has recognized that there are difficulties in emptying the hopper of hand-operated pecan harvesters and gatherers, which results in retrieved nuts being dumped imprecisely, often missing the targeted bucket or other desired destination, or causing nuts to be spilled by tipping of the storage container. In some cases the imprecision results in having to re-gather the scattered nuts. In addition, inverting the pecan harvester results in delay and inefficiency in gathering the nuts. As a result, an improved hand-held gatherer is needed that may be emptied more efficiently and with greater precision.

SUMMARY OF THE INVENTION

The present hand-held gatherer solves the problem of providing an improved apparatus for gathering nuts and other small objects without stooping to pick them up, collecting those objects in a basket tool and then depositing the objects efficiently and precisely where desired. The hand-operated gatherer retrieves nuts and objects using well-know wire bails in which the gathering device pressed against the object to be retrieved and the bails separate to capture the object within the storage component. However, the improved hand-operated gatherer of the present invention provides a hinged door biased to a closed position by a spring mechanism. The door opens via the hand-operated control of a linkage assembly connected to the door. One end of the linkage is connected to some portion of the door so as to provide an angular force causing the door to open when the linkage is retracted toward a handle. Generally, the control linkage will be some form of a small wire or metal rod.

The linkage may run through a shaft connected the gathering tool head to a handle. The opposing end of the linkage is connected to a trigger that is pivotally connected to the handle. The individual operator grasps the tool by the handle while gathering pecans or the like and, without moving his or her hand from the handle, is able to squeeze the trigger to retract the control linkage and open the door. Thus, the operator is able to accurately and effortlessly deposit items collected where desired by simple squeezing the trigger.

Therefore, an object of the present invention is to provide an improved hand-operated gatherer for retrieving and depositing items with improved accuracy and ease.

An object of the present invention is to provide a hand-operated gatherer that may be emptied without inversion of the gatherer.

An object of the present invention is to provide a hand-operated gatherer that does not require the application of force to the gathering tool portion of the device against a bucket or like to deposit items.

Another object of the present invention is to provide an improved hand-operated gatherer that remains simple and inexpensive to construct.

These and other objects will become more apparent upon reading the description of the preferred embodiment and reviewing the drawing referred hereto.

BRIEF DESCRIPTION OF THE DRAWINGS

FIG. 1a is a side plan view of the hand-held gatherer.

FIG. 1b is a side plan view of the hand-held gatherer showing the lateral movement of the door of the basket tool to accommodate release and deposit of the retained objects.

FIG. 3 is an enlarged fragmentary, sectional perspective view showing the handle assembly.

FIG. 4 is an enlarged sectional perspective view showing the connection of the control linkage within the handle assembly.

DESCRIPTION OF THE PREFERRED EMBODIMENT

Figure 2:
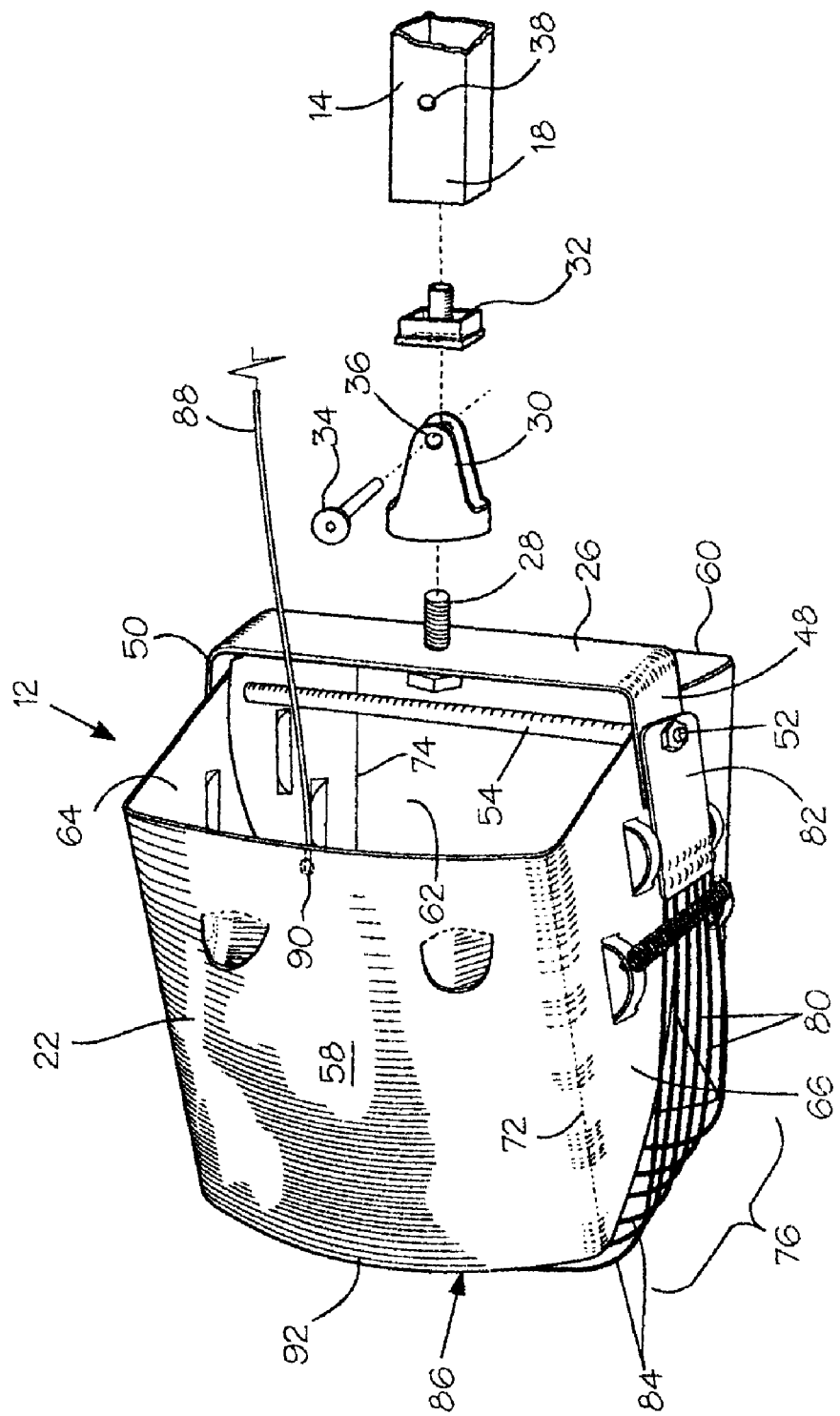
FIG. 2 is an enlarged fragmentary, sectional perspective view showing the basket tool assembly.

FIGS. 1a and 1b illustrate a hand-held gatherer 10 for efficiently collecting and depositing nuts or objects manually collected from the ground. The gathering tool includes a basket tool assembly 12, elongate shaft 14, and handle assembly 16. The basket tool assembly 12 is attached at a first end 18 of the shaft 14. The handle assembly 16 is attached at a second end 20 of the shaft 14. Combined these basic components, which may be manufactured separately, form a hand-held gatherer 10 that may be used by an individual standing upright to gather pecans, nuts, and other objects.

Further, the combined components provide novel features to dispose of those objects efficiently. In particular, the basket tool assembly 12 may be operated by the handle assembly 16 to provide for lateral movement of a portion of the basket assembly 12 to open and close and provide for a temporary opening on the bottom end of the basket assembly 12 for disposal of the objects held by the device 10 as directed by the individual, without the need for inversion of the gatherer 10.

The opening in the basket tool assembly 12 is provided in the preferred embodiment by the hinged doors 22 and 24. The hinged doors 22 and 24 are biased in a closed position and opened to release objects contained by the gatherer 10 using a means provided in communication with the handle assembly 16. As shown in FIG. 2, the door 22 is situated on the basket assembly 12 juxtaposed an oppositely disposed door 24.

The basket tool assembly 12 is retained on the first end 18 of the shaft 14 on a cross-member or frame 26. As shown in FIG. 2, an anchor bolt 28 may extend upward through the frame 26. An anchor bracket 30 is inserted on the bolt, and a nut 32 used to retain the anchor bracket 30 on the bolt. The first end 18 of the shaft 14 is attached to the anchor bracket 30 by a rivet 34, bolt, or like attaching device that is inserted through the apertures 36 in the anchor bracket 30 and the apertures 38 in the first shaft end, whereby the anchor bracket 30 and shaft 14 are coupled together.

The doors 22, 24 are retained on the frame 26 by attaching the upper side ends 40, 42 of each door to depending tabs 48, 50 extending from the frame 26. The doors 22, 24 may be pivotally attached to the depending tabs 48, 50 by nuts 52 and a single bolt 54 running lengthwise between the depending tabs 48, 50 or other suitable means. Upper side ends 40, 42 of each door 22, 24 may overlap to slidably move in relation to one another when the hinged door 22 is opened. The doors 22 and 24 may be biased to a closed position by a spring device 56 or equivalent thereof attached to each door 22, 24. A spring 56 may be attached between the doors 22 and 24 to maintain a biased closed position as shown in FIG. 1a.

The doors 22 and 24 each include planar wall portions 58, 60 that are juxtaposed to form the opposite walls of a storage component 62. The planar wall portions 58 and 60 each include a lowermost edge 25 at the lower end of the basket tool assembly 12 which each edge 25 is proximal to the ground when the gatherer is in use, the edges 25 being coplanar and separated intermediately by the gatherer head 76 to define a storage component 62.

Each of the wall portions 58, 60 of the doors 22, 24 terminate on either side by planar side walls 64, 66, as illustrated, and opposing side walls that are not illustrated. The opposing planar side walls are oriented at right angles to the respective wall portions 58, 60. The outside edge 68, 70 of each side wall 64, 66 is acutely angularly disposed with respect to the opposing inner edge 72, 74 adjoining the wall portions 58, 60. Thus, each side wall 64, 66 is triangularly shaped, which permits viewing of contents within the storage component 62 while maintaining the integrity of the closed state of the storage component 62 when the doors 22, 24 are biased to the closed position. The triangularly shaped side walls 64, 66 promote emptying of the contents of the storage component 62 when a door 22 is biased to the opened position as shown in FIG. 1b.

The doors 22, 24 are separated by a multi-finger flexible gatherer head 76. The head 76 may be constructed of steel wire forming a number of wire bails 78. Each bail 78 includes a pair of vertically depending members or legs 80 positioned at angles adjacent the doors 22, 24 and are affixed on their ends to a bracket 82 or suitable means for retention of the legs 80 desired relation to form the gatherer head 76. Each bail 78 further includes a bottom stretch 84 joining the legs 80 and extending horizontally in a direction normal to the opposing doors 22, 24. The horizontally extending bottom stretches 84 of the bails 78 are juxtaposed to one another and spaced relatively evenly apart in parallel, forming the ground engaging portion of the basket assembly 12.

In use, the gatherer 10 is operated to quickly and efficiently gather pecans, nuts, or other objects inside the storage component 62 by simply placing the gatherer 10 over an object with the bottom stretches 84 of the bails 78. As the individual presses down on the gatherer 10, force is applied to bias the bails 78 apart, thereby allowing the object to enter the bottom end 86 of the storage component 62. As the object passes into the storage component 62, the spring-like bails 78 close to their original, evenly spaced-apart position, preventing the object from dropping through the bottom end 86 of the storage component 62 until the doors 22 or 24 are opened.

A control linkage 88 provides means from communication between the handle assembly 16 and the basket tool assembly 12 for operation of one or both of the doors 22, 24 when opening the doors for disposal of objects contained within the storage component 62. Moving the control linkage 88 causes the biased door 22 or 24 to pivot about the hinge means or bolt 54. The control linkage 88 shown in FIG. 1a and FIG. 1b is attached to at least one of the doors, 22 or 24, in this case door 22, as shown in FIG. 2 by an anchor 90, rivet or other attaching device. The linkage 88 should be attached at a point on the door 22 such that a sufficient angular force may be provided by the linkage 88 to the door 22 to cause the door 22 to pivot about the hinge means 54 and open by moving the lower edge 92 of the wall portion 58 of the door 22 away from the outer bail 94 adjacent to the door 22.

The control linkage 88 may be comprised of a stiff wire of small diameter or other linking member of metal, plastic, composite or textile. From the door attachment point 90, the control linkage 88 may be run though an aperture 96 located in the shaft 14. The linkage 88 may then run through the shaft to the handle assembly 16.

The handle assembly 16 includes a handle 98, which may consist of two assembled halves. The handle 98 provides a convenient and comfortable means of grasping the gatherer 10. The handle 98 may be formed into a ergonomic pistol grip shape as shown enlarged in FIG. 3. The handle is attached to the second shaft end 20 by rivets 11 or similar fastening device.

The handle assembly 16 further includes a trigger 13 that is pivotally attached to the handle 98, such that the trigger 13 is angularly disposed spaced apart from the handle 98 for operation by an individual's fingers while the handle 98 is being gripped. As shown in FIG. 3, the trigger 13 is pivotally attached to the handle 98 by a pivot pin 15 having a female member 17 and male member 19 that interconnect through an aperture 21 in the combined handle 98 and trigger 13. The trigger 13 is situated between the handle 98 and the second shaft end 20, and the control linkage 88 is attached to the trigger 13, such as via a pin 23 situated within the trigger. As the trigger is pulled back by the individuals fingers, the control linkage 88 pulls open the door 22 connected to the opposite end of the control linkage 88.

The individual using the hand-held gatherer 10 may collect pecans, nuts or other objects in the storage component 62 of the gatherer 10 until the storage component 62 is full or the weight of the device becomes fatiguing. The individual situates the gatherer 10 over a bucket or other receptacle to release the objects into, and the individual actuates the trigger 13 to open the door 22 or 24 on the basket assembly 12 and release the objects with precision.

While the present invention has been particularly shown and described with reference to an embodiment thereof, it will be understood by those skilled in the art that various changes in form and detail may be made without departing from the spirit and scope of the present invention. Accordingly, it should be understood that my invention is intended to be limited only by the scope of the claims which follow and to extend to the subject matter of the latter and the equivalents thereof.

I claim:

1. A hand-operated gatherer comprising:
   a shaft having a first end and a second end;
   a basket tool assembly having a frame member, a pair of doors biased in closed position, and a gatherer head comprised of wire bails, the frame member attached at the first end of the shaft and each of the doors pivotally hinged to the frame member and presenting a lowermost edge at the lower end of the basket tool assembly in which each lowermost edge is proximal to the ground when the gatherer is in use, the edges being coplanar and separated intermediately by the gatherer head to define a storage component;
   a handle assembly attached at the second end of the shaft, the handle assembly having a grip attached to the shaft and a trigger pivotally attached to the grip in movable relation to the handle; and
   a control linkage attached to at least one of the doors and running lengthwise along said shaft to the handle assembly and attached at the handle assembly to the trigger, whereby the trigger is finger actuated to pull the control linkage and open said at least one of the doors that are attached to the control linkage.

2. A hand-operated gatherer as in claim 1 in which the control linkage consists of a stiff wire of small diameter attached to at least one of the doors at a point in which a sufficient angular force may be provided by the control linkage to the door to cause the door to pivot and open away from the gatherer head.

3. A hand-operated gatherer comprising:
   a shaft having a first end and a second end;
   a basket tool assembly having a frame member, a door biased in a closed position, an opposing wall of a storage compartment juxtaposed opposite the door, and a gatherer head comprised of wire bails, the frame member attached at the first end of the shaft and the door pivotally hinged to the frame member and the door and opposing wall each presenting a lowermost edge at the lower end of the basket tool assembly in which each lowermost edge is proximal to the ground when the gatherer is in use, the edges being coplanar and separated intermediately by the gatherer head to define the storage component;
   a handle assembly attached at the second end of the shaft, the handle assembly having a grip attached to the shaft and a trigger pivotally attached to the grip in movable relation to the handle;
   a control linkage attached to the door and running lengthwise along said shaft to the handle assembly; and
   the control linkage attached at the handle assembly to the trigger so as to pull the control linkage and cause the door to open away from the gatherer head to create an opening between the gatherer head and the door.

4. A hand-operated gatherer as in claim 3 in which the control linkage is attached to the door at a point in which a sufficient angular force may be provided by the control linkage to the door to cause the door to pivot and open away from the gatherer head.

* * * * *